United States Patent

[11] 3,573,480

[72] Inventor Donald L. Cummins
   Anderson, Ind.
[21] Appl. No. 858,724
[22] Filed Sept. 17, 1969
[45] Patented Apr. 6, 1971
[73] Assignee General Motors Corporation
   Detroit, Mich.

[54] ELECTRIC CRANKING MOTOR AUTOMATIC DISCONNECT AND LOCKOUT CIRCUIT
2 Claims, 1 Drawing Fig.

[52] U.S. Cl. .................................................. 290/38, 290/37
[51] Int. Cl. ..................................................... F02n 11/08
[50] Field of Search ............................................ 290/37, 38; 123/179 (Brig)

[56] References Cited
UNITED STATES PATENTS

| | | | |
|---|---|---|---|
| 3,264,483 | 8/1966 | Alexander | 290/38 |
| 3,415,999 | 12/1968 | Noury | 290/37X |
| 3,443,112 | 5/1969 | Huntzinger | 290/38 |
| 3,476,950 | 11/1969 | Carlson | 290/38 |

Primary Examiner—G. R. Simmons
Attorneys—Eugene W. Christen, Creighton R. Meland and Richard G. Stahr ABSTRACT: An electric-cranking motor automatic disconnect and lockout circuit. The normally open contacts of a cranking motor solenoid-operated switch, having the operating coil thereof connected across a source of direct current potential through the normally open contacts of a first relay, are connected in series with the cranking motor across a source of direct current potential. Upon the closure of an electric switch, the source of direct current potential energizes the operating coil of the first relay, through the electric switch and the normally closed contacts of a second relay in series, to close the associated normally open contacts thereof which establish an energizing circuit for the operating coil of the solenoid-operated switch. At least a portion of the output potential of an electric generator driven by the cranked engine is applied across the gate-cathode electrodes of a silicon-controlled rectifier, the anode-cathode electrodes of which are connected in series with another contact of the electric switch and the operating coil of the second relay across the source of direct current potential. When the generator output potential is of sufficient magnitude to produce gate-cathode current through the silicon-controlled rectifier, the resulting anode-cathode current flow therethrough establishes an energizing circuit for the operating coil of the second relay to open the associated normally closed contacts, thereby interrupting the energizing circuit for the operating coil of the first relay to permit the associated normally open contacts to open which interrupt the energizing circuit for the operating coil of the solenoid operated switch. The silicon-controlled rectifier is maintained conductive while the electric switch is closed to the anode-cathode electrodes thereof, consequently, the operating coil of the second relay remains energized thereby preventing a reengagement of the cranking motor while the engine is in the running mode.

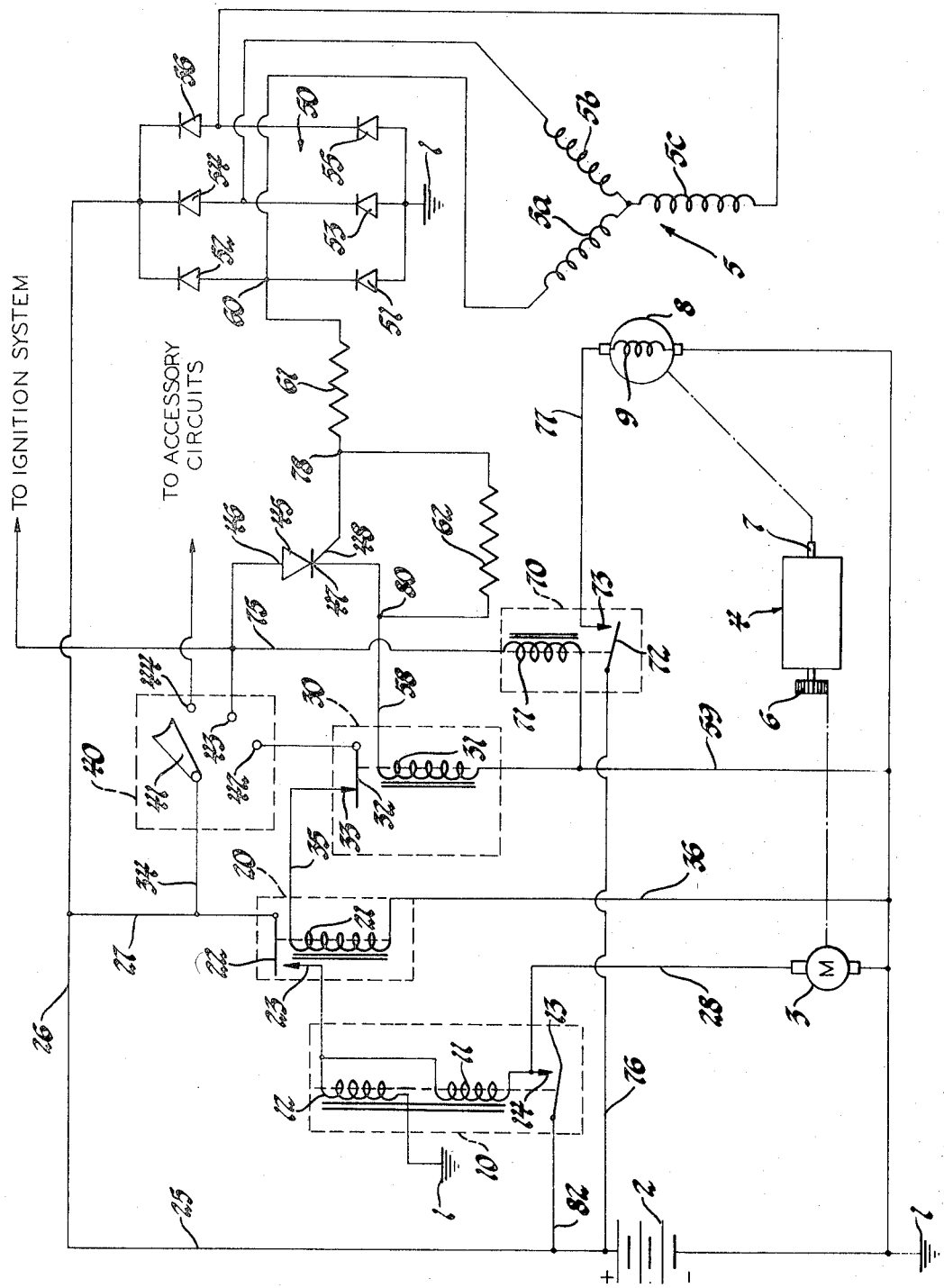

ELECTRIC CRANKING MOTOR AUTOMATIC DISCONNECT AND LOCKOUT CIRCUIT

This invention is directed to a cranking motor automatic disconnect and lockout circuit and, more specifically, to a circuit of this type which is responsive to the output potential magnitude of an electric generator driven by the cranked engine to automatically interrupt the cranking motor energizing circuit upon engine start and to prevent the reenergization thereof while the engine is in the running mode.

Electric cranking motors are frequently employed to start internal combustion engines which are used as a power source for a variety of applications. To prevent serious damage to the engine, the cranking motor and the cranking motor engagement mechanism, it is mandatory that the cranking motor be deenergized upon engine start. It is equally important that the cranking motor be not energized while the engine is in the running mode.

Therefore, a circuit which will automatically deenergize the cranking motor upon engine start and which will prevent the reenergization of the cranking motor while the engine is in the running mode is desirable.

It is, therefore, an object of this invention to provide an improved cranking motor automatic disconnect and lockout circuit.

It is another object of this invention to provide an improved cranking motor automatic disconnect and lockout circuit which is responsive to the output potential magnitude of an electric generator driven by the cranked engine to interrupt the cranking motor-energizing circuit upon engine start and to prevent the reestablishment thereof while the engine is in the running mode.

In accordance with this invention, a cranking motor automatic disconnect and lockout circuit is provided wherein the energizing circuit for the operating coil of the cranking motor solenoid-operated switch is interrupted upon the opening of the normally open contacts of a first relay connected in series therewith when the energizing circuit for the operating coil of the first relay is interrupted by the opening of the normally closed contacts of a second relay connected in series therewith in response to the output potential of an electrical generator driven by the cranked engine reaching a sufficient magnitude to produce anode-cathode conduction through a silicon-controlled rectifier which energizes the operating coil of the second relay.

For a better understanding of the present invention, together with additional objects, advantages and features thereof, reference is made to the following description and accompanying single FIGURE drawing which sets forth the cranking motor automatic disconnect and lockout circuit of this invention in schematic form. As point of reference or ground potential is the same point electrically throughout the system, it has been illustrated by the accepted symbol and referenced by the numeral 1 in the FIGURE.

Referring to the FIGURE, the cranking motor automatic disconnect and lockout circuit of this invention is set forth in schematic form in combination with a source of direct current potential, which may be a conventional storage battery 2, an electric cranking motor 3 connected thereacross through the normally open contacts of a cranking motor solenoid-operated switch 10 having at least one operating coil 11 and two normally open contacts, movable contact 13 and stationary contact 14, an internal combustion engine 4 to be cranked thereby and an electric generator 5 driven by the cranked engine 4.

As conventional electric cranking motors, internal combustion engines and electric generators adapted to be driven by internal combustion engines are well known in the art and, per se, form no part of this invention, in the interest of reducing drawing complexity, each has been symbolically represented in the FIGURE. Cranking motor 3 may be drivably engaged with gear 6 of engine 4 through any method well known in the automotive art and generator 5 may be driven by a belt-connecting pulley 7 of engine 4 and armature 8 of generator 5 in a manner well known in the automotive art.

The cranking motor solenoid-operated switch 10, hereinafter referred to as a solenoid-operated switch, is shown in the FIGURE to have two coils 11 and 12. This is a common expedient, particularly in the automotive art, for the purpose of conserving battery power. Coil 11 is the operating or "pull-in" coil which, when energized, closes movable contact 13 to stationary contact 14 and coil 12 is a "hold-in" coil which maintains movable contact 13 in electrical contact with stationary contact 14 after "pull-in" coil 11 is shorted out by the closed contacts. It is to be specifically understood that a solenoid-operated switch having only one coil may be used without departing from the spirit of the invention.

The electric generator 5 driven by engine 4 is shown in the FIGURE to be a three phase alternator having three output windings 5a, 5b and 5c. When field coil 9, rotated with armature 8, is energized by a direct current, a three phase potential is induced in output coils 5a, 5b and 5c. Although the electric generator 5 driven by the cranked engine 4 is shown in the FIGURE to be a three-phase alternator, it is to be specifically understood that the cranking motor automatic disconnect and lockout circuit of this invention is equally satisfactory for use with a direct current generator driven by the cranked engine 4.

Operating coil 11 of solenoid-operated switch 10 is connected across source of direct current potential 2 through the normally open contacts, movable contact 22 and stationary contact 23, of a first relay 20, through a circuit which may be traced from the positive polarity terminal of battery 2, through leads 25, 26 and 27, movable contact 22 and stationary contact 23 of relay 20, operating coil 11, lead 28, the armature of cranking motor 3 and point of reference or ground potential 1 to the negative polarity terminal of battery 2.

Operating coil 21 of relay 20 is connected across the source of direct current potential 2 through the normally closed contacts, movable contact 32 and stationary contact 33, of a second relay 30, and the movable contact 41 and one of the stationary contacts 42 of an electric switch 40, having a movable contact and at least two stationary contacts, through a circuit which may be traced from the positive polarity terminal of battery 2, through leads 25, 26 and 27, lead 34, movable contact 41 and stationary contact 42 of electric switch 40, contacts 32 and 33 of relay 30, lead 35, operating coil 21, lead 36 and point of reference or ground potential 1 to the negative polarity terminal of battery 2.

The electric switch 40 may be a conventional automotive type ignition switch having an open or "off" position, in which it is shown in the FIGURE, a "run" position at which movable contact 41 is closed to stationary contacts 43 and 44 and a "crank" position at which movable contact 41 is closed to stationary contacts 42 and 43. As is well known in the art, switches of this type are spring biased to automatically return to the "run" position wherein movable contact 41 is closed to stationary contacts 43 and 44 when the torque applied to the ignition key is released.

Operating coil 31 of relay 30 is connected across the source of direct current potential 2 through the movable contact 41 and another one of the stationary contacts 43 of electric switch 40 and the anode-cathode electrodes of a silicon-controlled rectifier 45, having an anode electrode 46, a cathode electrode 47 and a gate electrode 48, through a circuit which may be traced from the positive polarity terminal of battery 2, through leads 25, 26, 27 and 34, movable contact 41 and stationary contact 43 of electric switch 40, the anode-cathode electrodes of silicon-controlled rectifier 45, lead 58, operating coil 31, lead 59 and point of reference or ground potential 1 to the negative polarity terminal of battery 2.

For proper operation of the circuit of this invention, it is necessary that at least a portion of the output potential of the generator driven by the cranked engine be applied across the gate-cathode electrodes of silicon-controlled rectifier 45 in a polarity relationship to produce gate-cathode current flow therethrough.

As the generator 5 driven by cranked engine 4 is shown in the FIGURE to be a three-phase alternator, a three-phase diode bridge-type rectifier circuit 50 comprising the parallel combination of three pairs of series connected diodes 51—52, 53—54 and 55—56 is provided for rectifying the output potential thereof.

While generator 5 is producing an output potential, a half-wave rectified alternating current output potential appears across the junction between each series connected pair of diodes of rectifier circuit 50 and point of reference or ground potential 1 and is of a positive polarity at the junction between the diodes with respect to point of reference or ground potential 1.

To apply at least a portion of the output potential of generator 5 across the gate-cathode electrodes of silicon-controlled rectifier 45 in a polarity relationship to produce gate-cathode current flow therethrough, the gate electrode may be connected to the junction between any series connected pair of diodes of rectifier circuit 50 and the cathode electrode may be connected to point of reference or ground potential 1.

In the FIGURE, gate electrode 48 of silicon-controlled rectifier 45 is connected to junction 60 between series connected pair of diodes 51 and 52 through resistor 61 and the cathode electrode 47 thereof is connected to point of reference or ground potential 1 through the operating coil 31 of relay 30 and lead 59. Gate electrode 48 of silicon-controlled rectifier 45 may also be connected to either the junction between diodes 53 and 54 or the junction between diodes 55 and 56. With some applications, it may be desirable to apply only a portion of the potential appearing across the junction between any series connected pair of diodes of rectifier circuit 50 and point of reference or ground potential 1 across the gate-cathode electrodes of silicon-controlled rectifier 45. In this event, a resistor 62 may be connected across the gate-cathode electrodes of silicon-controlled rectifier 45. With resistor 62 in the circuit, only that portion of the output potential of generator 5 which is dropped across resistor 62 is applied across the gate-cathode electrodes of silicon-controlled rectifier 45.

Relay 70, having an operating coil 71, a movable contact 72 and a stationary contact 73, is a conventional generator field relay which establishes an energizing circuit for field coil 9 of generator 5 across source of direct current potential 2 while electric switch 40 is in the "crank" or "run" position. Although relay 70 is not a part of the circuit of this invention, one example of the electrical connection of this relay into the overall circuit has been illustrated in the FIGURE in the interest of a complete specification.

Upon the operation of movable contact 41 of electric switch 40 to the "crank" position at which it is in electrical contact with stationary contacts 42 and 43, an energizing circuit, previously described, is established for operating coil 21 of relay 20; an energizing circuit is established for operating coil 71 of field relay 70 and battery potential is connected across the anode-cathode electrodes of silicon-controlled rectifier 45 in the proper polarity relationship for anode-cathode conduction therethrough through a common circuit which may be traced from the positive polarity terminal of battery 2, through leads 25, 26, 27 and 34 and movable contact 41 and stationary contact 43 of electric switch 40 and respective branch circuits which may be thence traced through lead 75, operating coil 71 of relay 70, lead 59 and point of reference or ground potential 1 to the negative polarity terminal of battery 2 and through the anode-cathode electrodes of silicon-controlled rectifier 45, lead 58, operating coil 31 of relay 30, lead 59 and point of reference or ground potential 1 to the negative polarity terminal of battery 2.

Energized operating coil 21 of relay 20 closes movable contact 22 thereof into electrical contact with stationary contact 23 to complete an energizing circuit, previously described, for operating coil 11 and "hold-in" coil 12 of solenoid-operated switch 10.

Energized operating coil 71 of field relay 70 closes movable contact 72 thereof into electrical contact with stationary contact 73 to complete an energizing circuit for field coil 9 of generator 5 through a circuit which may be traced from the positive polarity terminal of battery 2, through lead 76, movable contact 72 and stationary contact 73 of field relay 70, lead 77, field coil 9 of generator 5 and point of reference or ground potential 1 to the negative polarity terminal of battery 2.

Energized operating coil 11 of solenoid-operated switch 10 closes movable contact 13 thereof into electrical contact with stationary contact 14 to complete an energizing circuit for cranking motor 3 which may be traced from the positive polarity terminal of battery 2 through lead 82, movable contact 13 and stationary contact 14, now closed, of solenoid-operated switch 10, lead 28, cranking motor 3 and point of reference or ground potential 1 to the negative polarity terminal of battery 2.

When the engine 4 starts, the energized field coil 9 of generator 5 induces a three-phase potential in output coils 5a, 5b and 5c thereof. The potential appearing across coils 5a and 5b or 5c is half-wave rectified and appears as a pulsating direct current potential across junction 60 and point of reference or ground potential 1 and is of a positive polarity upon junction 60 with respect to point of reference or ground potential 1 while the terminal end of output coil 5a is of a positive polarity. This pulsating direct current potential produces a current flow through series resistors 61 and 62, operating coil 31 of relay 30 and lead 59 to point of reference or ground potential 1. That portion of the output potential of generator 5 which is dropped across resistor 62 as a result of this current flow is of a positive polarity at junction 78 with respect to junction 80 and is applied across the gate-cathode electrodes of silicon-controlled rectifier 45 in the proper polarity relationship to produce gate-cathode electrode current flow therethrough. As the anode electrode of silicon-controlled rectifier 45 is connected to the positive polarity terminal of battery 2 and the cathode electrode thereof is connected to the negative polarity terminal of battery 2 through a circuit previously described, the gate-cathode current flow produced by the potential appearing across resistor 62 produces anode-cathode current flow through silicon-controlled rectifier 45 to complete the energizing circuit for operating coil 31 of relay 30 previously described.

Energized operating coil 31 of relay 30 opens the associated normally closed contacts 32 and 33 to interrupt the energizing circuit for operating coil 21 of relay 20.

Upon the deenergization of operating coil 21 of relay 20, the associated normally open contacts thereof open to interrupt the energizing circuit for "hold-in" coil 12 of solenoid-operated switch 10. With "hold-in" coil 12 of solenoid-operated switch 10 deenergized, the associated normally open contacts 13 and 14 open to interrupt the energizing circuit for and, consequently, automatically disconnect cranking motor 3.

At this time, movable contact 41 of electric switch 40 may be returned to the "run" position at which it is in electrical contact with stationary contacts 43 and 44 thus maintaining the energizing circuit for silicon-controlled rectifier 45 and operating coil 31 of relay 30 and places a positive polarity potential upon the accessory circuits and ignition system of the engine.

Should the movable contact 41 of electric switch 40 be inadvertently returned to the "crank" position bridging stationary contacts 42 and 43 after engine 4 has started and remains in the running mode, the cranking motor 3 would not be energized as the energizing circuit for operating coil 21 of relay 20 is open by the now open contacts 32 and 33 of relay 30.

To reset the circuit in preparation for another "crank" or engine start, movable contact 41 of electric switch 40 must be placed in the "off" position to interrupt the energizing circuit for silicon-controlled rectifier 45 and operating coil 31 of relay 30 thereby extinguishing silicon-controlled rectifier 45 and deenergizing operating coil 31 of relay 30, a condition which permits the normally closed contacts 32 and 33 thereof to return to the normally closed condition.

While specific electrical devices and polarities have been set forth in the specification, it is to be specifically understood that alternate electrical devices having similar electrical characteristics with compatible electrical polarities may be substituted therefor without departing from the spirit of the invention.

I claim:

1. An electric cranking motor automatic disconnect and lockout circuit comprising in combination with a source of direct current potential, a cranking motor connected thereacross through the normally open contacts of a solenoid-operated switch having at least one operating coil, an engine to be cranked thereby and an electrical generator driven by the engine:
   a first relay having an operating coil and two normally open contacts;
   means for connecting said operating coil of said solenoid-operated switch across said source of direct current potential through said normally open contacts of said first relay;
   a second relay having an operating coil and two normally closed contacts;
   an electric switch having a movable contact and at least two stationary contacts;
   means for connecting said operating coil of said first relay across said source of direct current potential through said normally closed contacts of said second relay and said movable contact and one of said stationary contacts of said electric switch;
   a silicon controlled rectifier having an anode, a cathode and a gate electrode;
   means for connecting said operating coil of said second relay across said source of direct current potential through said movable contact and another one of said stationary contacts of said electric switch and said anode-cathode electrodes of said silicon-controlled rectifier; and
   means for applying at least a portion of the output potential of said generator across said gate-cathode electrodes of said silicon-controlled rectifier in a polarity relationship to produce gate-cathode current flow therethrough.

2. An electric cranking motor automatic disconnect and lockout circuit comprising in combination with a source of direct current potential, a cranking motor connected thereacross through the normally open contacts of a solenoid-operated switch having at least one operating coil, an engine to be cranked thereby and a three-phase alternator driven by the engine:
   a first relay having an operating coil and two normally open contacts;
   means for connecting said operating coil of said solenoid-operated switch across said source of direct current potential through said normally open contacts of said first relay;
   a second relay having an operating coil and two normally closed contacts;
   an electric switch having a movable contact and at least two stationary contacts;
   means for connecting said operating coil of said first relay across said source of direct current potential through said normally closed contacts of said second relay and said movable contact and one of said stationary contacts of said electric switch;
   a silicon controlled rectifier having an anode, a cathode and a gate electrode;
   means for connecting said operating coil of said second relay across said source of direct current potential through said movable contact and another one of said stationary contacts of said electric switch and said anode-cathode electrodes of said silicon-controlled rectifier;
   a three-phase diode bridge-type rectifier circuit comprising the parallel combination of three pairs of series connected diodes for rectifying the output of said three-phase alternator; and
   means for connecting said gate electrode of said silicon-controlled rectifier to a junction between any two of said series connected diodes of said rectifier circuit.